3,455,970
1-AMINO-2-ALKOXY-4-ANTHRAQUINONYL-
ARALKYL URETHANES
Hans Rudolf Rickenbacher, Basel, Switzerland, assignor
to Ciba Limited, Basel, Switzerland, a company of
Switzerland
No Drawing. Filed Nov. 15, 1966, Ser. No. 594,376
Claims priority, application Switzerland, Nov. 24, 1965,
16,179/65
Int. Cl. C09b 1/40, 1/22; D06p 1/20
U.S. Cl. 260—377                              5 Claims

ABSTRACT OF THE DISCLOSURE

Water-insoluble anthraquinone dyestuffs of the formula

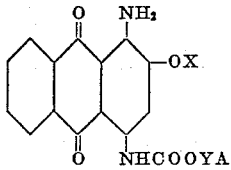

in which A represents an aryl radical, X represents an alkyl or alkoxy alkyl group, preferably a methyl radical, and Y represents an alkylene group provide dyeings characterized by excellent fastness to light and sublimation and by good wool reservation.

---

The present invention provides water-insoluble anthraquinone dyestuffs of the formula

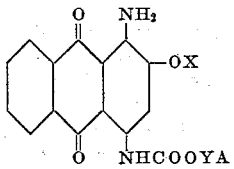

in which A represents an aryl radical, X represents an alkyl or alkoxy alkyl group, preferably a methyl radical, and Y represents an alkylene group.

The present invention especially provides water-insoluable anthraquinone dyestuffs of the formula

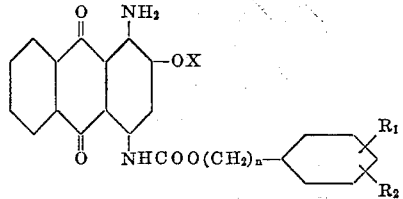

in which X represents an alkyl or alkoxyalkyl group, preferably a methyl group, $R_1$ and $R_2$ each represents a hydrogen or a halogen atom, or an alkyl or alkoxy group and $n$ is a number having a value of 1 to 3.

The present invention also provides a process for preparing water-insoluble anthraquinone dyestuffs of formula

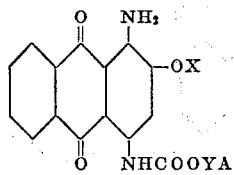

in which A represents an aryl radical, X represents an alkyl group or an alkoxyalkyl group and Y represents an alkylene group, by reacting a 1,4-diaminoanthraquinone of formula

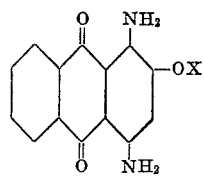

with a halogenoformic acid aralkyl ester.

The 1,4-diaminoanthraquinone to be used as the starting substance may contain, for example, an ethoxy, isopropoxy, n-butoxy, β-methoxyethoxy, β-ethoxyethoxy or especially a methoxy group in the 2-position.

A halogenoformic acid aralkyl ester of formula

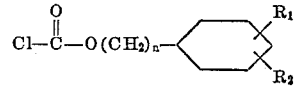

in which $R_1$ and $R_2$ each represents a hydrogen or a halogen atom or an alkyl or alkoxy group, and $n$ is a number having a value of 1 to 3 is preferably used. The chloroformic acid benzyl esters are of especial interest. As examples there may be quoted: benzyl chloroformate, p-methylbenzyl chloroformate, p-methoxybenzyl chloroformate, p-chlorobenzyl chloroformate, α-methylbenzyl chloroformate, phenylethyl chloroformate.

The condensation between the 1,4-diaminoanthraquinone and the halogenoformic acid aralkyl ester may preferably be carried out in an inert high-boiling organic solvent, for example, in chlorobenzene, o-dichlorobenzene or nitrobenzene. The process is preferably carried out at a temperature above 100° C., especially within the range of from 110° to 150° C., and preferably in the presence of an acid-binding reagent, for example, an alkali metal carbonate or a tertiary base.

The dyestuffs obtained in accordance with the process are suitable for dyeing hydrophobic fibres, for example, fibres of cellulose 2½-acetate, cellulose triacetate, polyamides and especially aromatic polyesters. The resulting dyeings are distinguished by excellent fastness to light and sublimation.

As compared to the 1-amino-2-alkoxy-4-anthraquinonylalkyl urethanes described in United States patent specifications 2,967,871 and 2,937,190 the dyestuffs obtainable according to the invention are distinguished by better fastness to sublimation and by greater ease of manufacture.

For dyeing purposes the new dyestuffs are advantageously used in a finely divided form, and dyeing is carried out with the addition of dispersing agents, for example, soap, sulphite cellulose waste lye or synthetic detergents, or a combination of various wetting agents and dispersing agents. It is generally advantageous to convert the dyestuff into a dyestuff preparation, such dyestuff preparations containing a dispersing agent and a finely divided dyestuff in such a form as to produce a fine dispersion on dilution with water. Such dyestuff preparation may be obtained by a method known per se, for example, by reprecipitating the dyestuff from sulphuric acid and grinding the resulting sludge with sulphite waste lye, or optionally by grinding the dyestuff in high efficiency grinding equipment in a dry or wet form, with or without the addition of dispersing agents during the grinding process.

In order to achieve more intense dyeings on polyethylene terephthalate fibres it proves advisable to add a swelling agent to the dye bath, or especially to carry out the dyeing process under pressure at a temperature above 100° C., for example, at 120° C. Suitable swelling agents are aromatic carboxylic acids for example, benzoic acid or salicylic acid, phenols, such as, for example, o-hydroxydiphenyl or p-hydroxydiphenyl, aromatic halogen compounds, such as, for example, chlorobenzene, o-dichlorobenzene or trichlorobenzene, phenylmethyl carbinol or diphenyl. When dyeing under pressure it proves advantageous to render the dye bath weakly acid, for example, by adding a weak acid, for example, acetic acid.

As a result of their fastness to alkali the new dyestuffs are also suitable for dyeing by the so-called thermofixation process, according to which the fabric to be dyed is impregnated with an aqueous dispersion of the dyestuff which advantageously contains within the range of from 1 to 50% of urea and a thickening agent, especially sodium alginate, preferably at temperatures of not greater than 60° C., and is squeezed out in the usual manner. The impregnated goods are advantageously squeezed out in such a way as to retain dye bath liquid amounting to within the range of from 50 to 100% of their initial weight.

In order to fix the dyestuff, the fabric which has been impregnated in this way is advantageously heated to a temperature of above 100° C., for example, to a temperature within the range of from 180° C. to 220° C., after having been previously dried, for example, in a warm stream of air.

The thermofixation process referred to above is of especial interest for dyeing union fabrics of polyester fibres and cellulose fibres, especially cotton. In this case the padding liquid contains, in addition to the dyestuffs of the invention, dyestuffs which are suitable for dyeing cotton, especially vat dyestuffs, or reactive dyestuffs, that is to say dyestuffs which may be fixed to cellulose fibres with the formation of a chemical bond, such as, for example, dyestuffs containing a chlorotriazine or chlorodiazine residue. In the latter case it proves advisable to add an acid-binding reagent, for example, an alkali metal carbonate or alkali metal phosphate, alkali metal borate or alkali metal perborate or mixtures of any two or more of these to the padding solution. When using vat dyestuffs it is necessary to treat the padded fabric, after the heat treatment, with an aqueous alkaline solution of a reducing agent known to be suitable for use in vat dyeing.

As a result of their good wool reservation the dyestuffs of the invention are also outstandingly suitable for dyeing union fabrics of polyester fibres and wool.

The resulting dyeings are advantageously subjected to an aftertreatment, for example, by heating with an aqueous solution of a nonionic detergent.

The dyestuffs may also be applied by printing instead of impregnation. For this purpose a printing ink is for example, used which in addition to the usual auxiliary printing agents, for example, wetting agents and thickening agents, contains the finely dispersed dyestuffs optionally mixed with one of the above-mentioned cotton dyes, optionally in the presence of urea and/or an acid-binding reagent.

The following example illustrates the invention. Unless otherwise stated, the parts denote parts by weight, the percentages by weight and the temperatures are given in degrees centigrade.

EXAMPLE

A mixture of 220 parts of chlorobenzene, 26.8 parts of 1,4-diamino-2-methoxyanthraquinone and 10.6 parts of anhydrous sodium carbonate are warmed to boiling in a glass apparatus having a stirrer, thermometer, dropping funnel and descending condenser, and 10 parts of chlorobenzene are distilled off in order to azeotropically remove any water which may still be present in the mixture. The descending condenser is then replaced by a reflux condenser and 19.2 parts of benzyl chloroformate in the form of a 70% solution in toluene are added dropwise over the course of 15 minutes to the mixture which is stirred at 125 to 130°. Stirring is continued for a further hour at 130 to 135°, the mixture allowed to cool and the reaction product filtered off. The filter cake is steam-distilled in order to remove the adhering chlorobenzene. The product is filtered, washed with water and dried at 120°. The dyestuff is obtained in a yield of 31.5 parts. Polyester fibres are dyed from aqueous dispersion to give pure pink shades of good fastness to light and sublimation.

In the table which follows a series of further dyestuffs are listed which are obtained if 1,4-diamino-2-methoxyanthraquinone is reacted with a chloroformic acid ester of an alcohol quoted in column I, according to the data of this example. Column II gives the shade of the polyester dyeings obtained with the dyestuffs.

| | I | II |
|---|---|---|
| 1 | β-Phenylethyl alcohol | Pink. |
| 2 | α-Phenylethyl alcohol | Do. |
| 3 | p-Methylbenzyl alcohol | Do. |
| 4 | p-Methoxybenzyl alcohol | Do. |
| 5 | 2,4-dimethylbenzyl alcohol | Do. |
| 6 | α-Naphthylmethyl alcohol | Do. |

Dyeing instruction 1 part of the dyestuff obtainable in accordance with paragraph 1 of this example is ground wet with 2 parts of a 50% aqueous solution of sulphite cellulose waste lye and dried.

This dyestuff preparation is stirred with 40 parts of a 10% aqueous solution of a condensation product of octadecyl alcohol with 20 moles of ethylene oxide, and 4 parts of a 40% acetic acid solution are added. From this, 4000 parts of a dye bath are prepared by dilution with water.

100 parts of a cleaned polyester fabric are introduced into this bath at 50°, the temperature is raised to 120–130° over the course of half an hour and dyeing carried out for 1 hour at this temperature. Thereafter the fabric is thoroughly rinsed. A pure pink dyeing having good fastness to light and sublimation is obtained.

What is claimed is:

1. Water-insoluble anthraquinone dyestuffs of formula

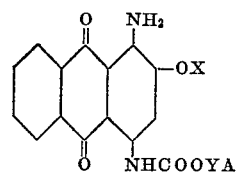

in which A represents a phenyl or naphthyl radical, X represents a lower alkyl or lower alkoxyalkyl group and Y represents a lower alkylene group.

2. Water-insoluble anthraquinone dyestuffs as claimed in claim 1 of formula

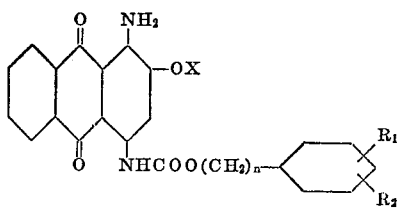

in which X represents a lower alkyl or lower alkoxyalkyl group, $R_1$ and $R_2$ each represents a hydrogen or a halogen atom, or a lower alkyl or lower alkoxy group and $n$ is a number having a value of 1 to 3.

3. Water-insoluble anthraquinone dyestuffs as claimed in claim 2, in which X represents a methyl group.

4. A dyestuff as claimed in claim 1 of the formula

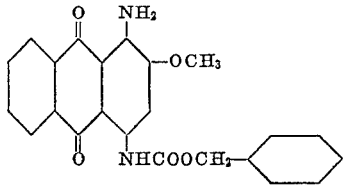

5. A dyestuff as claimed in claim 1 of the formula

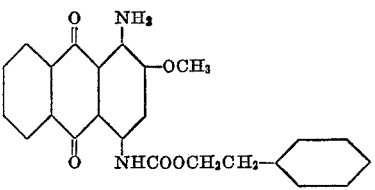

References Cited

UNITED STATES PATENTS 2,967,871   1/1961   Straley et al. _____ 260—377
3,097,909   7/1963   Rhyner et al. ____ 260—376 XR LORRAINE A. WEINBERGER, Primary Examiner HAROLD C. WEGNER, Assistant Examiner U.S. Cl. X.R.

8—39, 40